United States Patent
Plogmann et al.

(10) Patent No.: US 6,172,175 B1
(45) Date of Patent: Jan. 9, 2001

(54) AQUEOUS TWO-COMPONENT POLYURETHANE COATING COMPOSITIONS BASED ON 2-METHYLPENTANE-1,5-DIISOCYANATE

(75) Inventors: Friedrich Plogmann, Castrop-Rauxel; Rainer Lomoelder, Muenster; Dirk Reichel, Dorsten, all of (DE)

(73) Assignee: Creanova Spezialchemie GmbH, Marl (DE)

( * ) Notice: Under 35 U.S.C. 154(b), the term of this patent shall be extended for 0 days.

(21) Appl. No.: 09/243,494

(22) Filed: Feb. 3, 1999

(30) Foreign Application Priority Data

Feb. 5, 1998 (DE) .............................. 198 04 451

(51) Int. Cl.$^7$ ..................................... C08G 18/62
(52) U.S. Cl. ................. 528/67; 528/73; 528/80; 524/839
(58) Field of Search ................... 528/73, 67, 80; 524/839

(56) References Cited

U.S. PATENT DOCUMENTS

| | | | |
|---|---|---|---|
| 4,772,665 | * | 9/1988 | Disteldorf .................... 525/123 |
| 5,075,370 | * | 12/1991 | Kubitza ....................... 524/591 |

* cited by examiner

*Primary Examiner*—Rachel Gorr
(74) *Attorney, Agent, or Firm*—Oblon, Spivak, McClelland, Maier & Neustadt, P.C.

(57) ABSTRACT

An aqueous 2-component PU coating composition essentially comprising: A) an aqueous dispersion of at least one polyol component, B) a polyisocyanate component based on 2-methylpentane 1,5-diisocyanate, the proportions of A and B corresponding to an OH/NCO equivalents ratio of from 1:0.5 to 1:5.

17 Claims, No Drawings

AQUEOUS TWO-COMPONENT POLYURETHANE COATING COMPOSITIONS BASED ON 2-METHYLPENTANE-1,5-DIISOCYANATE

BACKGROUND OF THE INVENTION

1. Field of the Invention

The invention relates to an aqueous two-component coating composition based on 2-methylpentane-1,5-diisocyanate (referred to below as MPDI).

2. Discussion of the Related Art

Aqueous coating systems are becoming increasingly important, for reasons of economy and ecology. In chemically crosslinking two-component polyurethane coating materials, compounds which include free isocyanate groups ("polyisocyanates"), are used as hardeners for the binder, which is generally an organic polymer having NCO-reactive groups (polyacrylatepolyol, polyetherpolyol or polyesterpolyol). These coating materials have acquired great importance owing to their outstanding properties, in particular their high weathering, resistance to yellowing and chemical stability, and the excellent balance of hardness and flexibility in the coatings produced therewith. It was impossible, until recently, to use such coatings in the absence of an organic solvent (Farbe+Lack 97, 1991, 201–206). For a long time, the use of water in polyurethane coatings appeared impossible because isocyanate groups are known to react not only, as desired, with the organically bonded NCO-reactive groups of the binder but also, undesirably, with water. That reaction produces urea structures and carbon dioxide is liberated. This is said to lead, firstly, to a reduction in the crosslinking density of the cured coating, and, secondly, to the formation of foam as a result of the gas given off. This, in turn, has disadvantageous consequences for the processability of the systems and for the optical properties of the coatings. Overall, aqueous systems of this kind appeared impractical owing to inadequate pot lives and the not entirely satisfactory properties of the coatings.

The hydrolysis of isocyanate groups can be prevented by blocking (or masking) them. For this purpose, the free polyisocyanates are reacted with blocking agents (secondary or tertiary alcohols; lactams or oximes). The blocked polyisocyanates are stable at room temperature and at moderately elevated temperatures and can be blended with the binder to form aqueous one-component coating compositions. At the curing temperatures of the coatings, the blocking agent is eliminated. The isocyanate groups liberated react with the reactive groups of the binder and, in doing so, crosslink the chains. Blocked isocyanates, although avoiding the problems associated with the hydrolysis of the isocyanate groups, nevertheless require an additional process step in terms of blocking and considerably higher curing temperatures and, moreover, in the course of curing, they release the blocking agent which cannot be discharged immediately into the environment.

As a result, there had always been a desire for an aqueous two-component polyurethane coating system with a hardener containing free isocyanate groups. According to DE 27 08 442 and DE 35 29 249, organic di- and/or polyisocyanates are added to polymer dispersions in order to improve the profile of properties. The dispersed polymers, however, are not the organic polyhydroxy compounds usual in polyurethane chemistry as co-reactants for polyisocyanates but are substances which are inert toward isocyanate groups. The property-improving effect is, therefore, attributable not to a chemical crosslinking but to the envelopment of the dispersed polymer with the polyurea compound formed from the isocyanate and water.

Chemically crosslinking aqueous two-component polyurethane coating compositions with free polyisocyanates as hardeners for the binder were, as far as is apparent, described for the first time in EP 0 358 979. According to that patent, polyhydroxy acrylates, as a binder component, are able to emulsify certain polyisocyanates having free isocyanate groups, which are also known as paint polyisocyanates. The resulting aqueous two-component system cures to form crosslinked films. The paint polyisocyanates are oligomeric derivatives, containing biuret, urethane, uretdione and/or isocyanurate groups, of readily available monomeric or simple diisocyanates, in particular of hexamethylene diisocyanate (HDI), isophorone diisocyanate (IPDI) and/or bis (isocyanatocyclohexyl)methane ($H_{12}$MDI or just HMDI). The paint polyisocyanates used, in accordance with EP 0 358 979, have a viscosity at 23° C. of up to 1000 mPa•s and an average NCO functionality of from 2.2 to 5. Like the abovementioned blocked polyisocyanates, the paint polyisocyanates are prepared in a separate process step and, because of their relatively high molecular weight, are diluted to application viscosity with organic solvents or are rendered self-dispersible through the incorporation of ionic or nonionic hydrophilic centers.

Further publications deal primarily with expanding the field of use of emulsifying binder components and with varying—which includes nonionichydrophilic modification by alkoxylation—the polyisocyanate hardener components, primarily with the aim of extending the pot life and of improving the profile of properties of the coatings. Hydrophilically modified polyisocyanates, however, present problems as a hardener component, since the cured coatings still contain hydrophilic groups and so are more or less sensitive to water. Examples of binder variations and/or of the use of hydrophilic modified polyisocyanates can be found in EP 0 469 389, 0 496 205, 0 496 210, 0 542 085, 0 542 105, 0 543 228, 0 562 436, 0 583 728, 0 587 061, 0 603 219, 0 610 450, 0 626 401, 0 639 594, 0 654 051, 0 654 052, 0 654 055, 0 657 483, 0 700 945, 0 707 608, 0 731 119, 0 742 239 and 0 746 578. Patents dealing specifically with the preparation of hydrophilically modified polyisocyanates for use in water-dispersed two-component polyurethane systems include EP 0 206 059, 0 516 277, 0 540 985, 0 548 669, 0 645 410, 0 680 983, 0 703 255, 0 728 785 and 0 754 713.

In the case of two-component coating formulations, a fundamental prerequisite for good performance properties is always a particularly fine and highly homogeneous mixing of the crosslinker component with the binder component. This is especially important in the case of aqueous systems, since owing to the chemical nature of the substances used there is no infinite miscibility and so homogeneous, single-phase systems do not result spontaneously; rather, intensive stirring is necessary at the very least. Because of their low viscosity, polyisocyanates based on HDI have been employed primarily to date as a hardener component for aqueous 2-component polyurethane (PU) systems. Nevertheless, polyisocyanates based on IPDI and HMDI can also be used, although, because of the aggregate state, larger amounts of organic solvents are required for formulation than in the case of HDI polyisocyanates, something which is desired to avoid specifically in the case, of environment-friendly aqueous systems.

As mentioned, 2-component PU systems are known for their high weathering, yellowing and chemical stability. According to WO 93/05090, a further improvement in the resistance of the coatings to environmental influences is obtained, in the case of solvent-containing 2-component PU systems, with the use of a mixture of polyisocyanates of HDI with those of IPDI. Adversely affected, on the other hand, is the resistance to mechanical stresses, such as scratch resistance and washline resistance, for example (I-Lack 61, 1993, 30).

An object of this invention is to find new aqueous two-component polyurethane systems in order to obtain improved optical, mechanical, physicochemical and applications-related properties.

This is important in order for the aqueous coating systems to compete successfully with the extremely high quality of solvent-based coating systems, which has not been possible to replace readily by environment-friendly aqueous coating systems without a drop in quality.

The object has been achieved by the aqueous two-component coating compositions of the present invention.

SUMMARY OF THE INVENTION

The present invention provides aqueous two-component polyurethane coating compositions essentially comprising:
A) an aqueous dispersion of at least one polyol component,
B) a polyisocyanate component based on 2-methylpentane-1,5-diisocyanate, the proportions of A and B corresponding to an OH/NCO equivalents ratio of from 1:05 to 1:5.

BRIEF DESCRIPTION OF THE PREFERRED EMBODIMENTS

It has surprisingly been found that when polyisocyanates based on MPDI are used as a hardener component in aqueous 2-component PU systems this results in diverse and unexpected advantages over the aqueous 2-component PU systems which have been used frequently to date and which employ HDI-based polyisocyanates as hardener component. For instance, given an equivalent formulation, markedly more rapid initial drying and a distinct increase in the ultimate hardness of the coatings, in particular, has been found, which is all the more surprising since this was not observed in purely aqueous systems. Great advantages, therefore, result not only in processing, owing to a shorter dust-dry time and more rapid attainment of sandability/overcoatability, but also in connection with the coatings themselves (greater hardness and resistance to environmental influences with no deterioration in the good flexibility).

Polyisocyanates based on 2-methylpentane-1,5-diisocyanate (MPDI) are known. Their preparation is described in DE 31 51 853, DE 31 51 855 and DE 32 27 779. Publications have also appeared that relate to the use of MPDI polyisocyanates in polyurethane systems. DE 31 51 854 deals in relative depth with polyisocyanates based on MPDI in solvent-containing, purely organic 2-component PU systems, in which improved thermal stability at 240° C. in comparison with other polyisocyanates is described. The use of MPDI-based polyisocyanates as a hardener component in aqueous two-component polyurethane coating materials, on the other hand, is not described.

As binder component A it is possible to use a hydrophilic system which is customary for two-component coating compositions and which constitute water-thinable systems, i.e. a water-dispersed polyhydroxy compound, in each case alone or as a mixture of two or more representatives. Depending on the nature and amount of any organic auxiliary solvent present, on the molar weight and on the degree of hydrophilicity, the binder components A are in disperse distribution (with average particle size of >0.1 μm), are in colloidal dispersion (with average particle size diameter in the range from 10 to 100 nm) or else are in molecularly dispersed distribution (with average particle size diameter of <10 nm). The above particles are substantially spherical. In general there are not only fractions that are in disperse distribution but also fractions that are in colloidal and molecular dispersion. In any case the binder component A, whether as a dispersion or as a colloidally to molecularly disperse "solution", must be dilutable with water. Suitable solvents which, in addition to water, may be used as the continuous phase are those which are inert in the sense of an isocyanate reaction and which under atmospheric pressure (1013 mbar) boil below 300° C., preferably at from 100 to 250° C. The preferred solvents have ether and ester groups in the molecule and are compatible with water to the extent that the solutions or dispersions form systems featuring a homogeneously distributed water/cosolvent phase. The aqueous "solution" of the dispersion generally has a solids content of from 20 to 80% by weight, a viscosity at 23° C. of from 10 to 10,000 mPa•s and a pH of from 6 to 10.

The binder components A can be known OH functional addition polymerization, condensation polymerization or polyaddition resins, such as polyacrylate resins, polyester resins and polyurethane resins. Also suitable are mixtures of two or more resins from the same or from different classes. The molecular weight can vary greatly; for example, the number-average molecular weight (Mn) can be from 500 to 100,000. The resins can be linear or branched. The water-dilutability of these resins and the stability of the dilute solutions or dispersions derives in general from the presence of tonically hydrophilic groups, such as carboxylate, sulfonate or quaternary ammonium groups, which are formed by the neutralization of potentially ionically hydrophilic groups, such as carboxylic acid, sulfonic acid or tertiary amino groups. The potentially ionic carboxyl groups are in general not neutralized fully, so that the resins generally have acid numbers of between 20 and 100 mg of KOH/g. Of course, the hydroxyl groups required for the reaction with the isocyanate groups of the hardener component B also contribute to the hydrophilicity of the binder component A and hence to the dilutability in water. In addition to the hydroxyl groups, it is also possible for further hydrophilicizing groups to be present in the molecule, e.g. polyoxyalkylene groups, and also further groups that are able to react with isocyanate groups, such as CH-acidic groups such as malonic acid derivatives, mercapto, imino or amino groups that are attached to the polymer skeleton. Preferred binder components A have hydroxyl numbers of from 50 to 300, advantageously from 100 to 200.

The dispersions of the binder component A may additionally comprise other water-dilutable organic polyhydroxy compounds that are compatible with the respective binder component A, such as water-soluble alcohols having more than two hydroxyl groups and possibly containing oxyalkylene groups, such as glycerol, trimethylolethane, trimethylolpropane, 1,2,4-butanetriol, 1,2,6hexanetriol and pentaerythritol, and also the ethoxylation and/or propoxylation products of these alcohols. With the aid of these components it is possible to modify the performance properties of the cured coating and adapt them to particular requirements.

As the polyisocyanates of the invention based on MPDI it is possible to employ biuret-, uretdione- and/or isocyanurate-based polyisocyanates (DE 31 51 853, DE 31

51 855 and DE 32 27 779) and/or those in allophanate-modified form, as described in principle in EP 0 535 483. The average NCO functionality is generally from 2.3 to 5. In a preferred embodiment use is made of polyisocyanates having a residual monomer content of <0.5% by virtue of distillative separation. Particular preference is given to isocyanurate-containing polyisocyanates.

The polyisocyanates based on MPDI can be employed as a blend with other polyisocyanates. Examples of polyisocyanates highly suited to this purpose are the (cyclo)aliphatic "paint polyisocyanates" based on HDI, IPDI or HMDI, which are described at length in the abovementioned EP 0 358 979, and/or aromatic polyisocyanates, such as, for example, tetramethylxylylene diisocyanate (TMXDI), diisocyanatotoluene (TDI) and/or diisocyanatodiphenylmethane (MDI). In general, these polyisocyanates are added only in minor amounts in order to bring about specific variation in certain properties of the coating compositions.

The overall polyisocyanate component should have a viscosity at 23° C. of 10–20,000 mPa•s. If necessary, therefore, the polyisocyanates can be employed in a blend with small amounts of inert solvents in order to adjust the viscosity to a level that is appropriate to the intended use. The amount of such solvents, however, should be at most such as to give a maximum content of 20% by weight in the coating compositions of the invention that are ultimately obtained, including any solvent still present in the aqueous binder dispersions in this calculation. Examples of solvents suitable as additives for the polyisocyanates are aromatic hydrocarbons, esters, ethers and/or ketones.

The use of hydrophilicized polyisocyanates is likewise possible. By this means, it is possible, in many cases, to improve certain properties of the binder combinations, such as stability and compatibility, for example. Hydrophilicized polyisocyanates include, for example, polyether segments based on ethylene oxide with or without propylene oxide, and/or based on carboxylate groups.

To prepare the ready-to-use coating compositions, the hardener component B is emulsified, shortly before the processing of the coating composition, in the dispersion of the binder component A, the latter adopting the function of an emulsifier for the polyisocyanate component. In any case, an additional emulsifier is unnecessary, although it may be useful in some cases. The two components can be mixed simply by stirring them together at room temperature. It is advantageous to exert strong shear forces, by means, for example, of high-speed stirrers, dissolvers, vibrators or turbine mixers. This produces the desired fine distribution of the hardener component B in the dispersion of the binder component A. It is advantageous if the average particle size of the finely distributed hardener component B lies within the same order of magnitude as that of the binder component A. The amounts of the binder component A and of the hardener component B are such that the ratio of equivalents of the hydroxyl groups in the binder component A to the isocyanate groups in the hardener component B is from 1:0.5 to 1:5, preferably from 1:0.9 to 1:3.

If the viscosity is too high for the intended application technique, it can be readily adjusted to an appropriate level by adding organic solvent or water.

When components A and B are mixed, the binder component A causes the hardener component B to evade the effect of the water, whether by diffusion of the polyisocyanate into the dispersed particles of the binder component A or by stabilization of the polyisocyanate droplets that have formed, by virtue of an emulsifying effect of the dispersed polyol particles of the binder component A. For whatever reason, when the coating compositions are stored and processed appropriately, there is no notable loss of polyisocyanate by reaction with water. Accordingly, there is also no notable evolution of carbon dioxide.

The coating compositions of the invention have the advantage that they can be formulated without the addition of external emulsifiers. Therefore, they are preferably free from external emulsifiers. However, it is, of course, possible to add emulsifiers when formulating. They may also include other customary auxiliaries and additives, examples of which are pigments, defoamers, leveling agents, thickeners, siccatives, fillers and/or catalysts for the isocyanate addition reaction. These auxiliaries and additives are not coating composition constituents that are essential to the invention. They are located generally within the binder component A and can be added to said component, if desired, before or after it is dispersed. The former is always preferable when the auxiliary or additive concerned is intended not to enter the aqueous phase.

In their clearcoat application, the solids content of the coating compositions is generally between 25 and 60% by weight, preferably between 30 and 55% by weight, and the proportional organic auxiliary solvents is between 0 and 20% by weight, preferably between 0 and 15% by weight. The proportion of water in the coating composition is correspondingly, in general, in the range from 20 to 75% by weight, preferably between 30 and 65% by weight. The initial viscosity of the coating composition at 23° C., in other words the viscosity directly after components A and B have been mixed and the mixture has, if desired, been diluted, is usually from 10 to 1000 mPa•s, and the pH is generally between 6 and 10.

Since the coating compositions prepared in this way comprise reactive components, they cannot be stored indefinitely before being processed. The pot life/processing time depends, inter alia, on the chemical nature of the binder component A and of the hardener component B. It is generally the case that the coating compositions, stored at room temperature, should be consumed at the latest within 12 hours, judiciously within 8 hours, following their preparation by the mixing of components A and B. The coating compositions are suitable for virtually all fields of use in which solvent-containing or solvent-free coating systems are used to produce high quality coatings on substrates which withstand the necessary curing temperatures. They are applied to the substrates by customary techniques, such as knife coating, spraying, dipping or brushing. The coatings of the invention are generally cured preferably at from 20 to 150° C., with higher temperatures accelerating cure. The resulting coating films are scratch-resistant and solvent-stable, free from bubbles and, as clearcoats, transparent. The coating compositions of the invention are particularly suitable for producing topcoats on wooden, metal and plastic substrates.

Having generally described this invention, a further understanding can be obtained by reference to certain specific examples which are provided herein for purposes of illustration only and are not intended to be limiting unless otherwise specified.

The following Examples are also recited in the priority document, German patent application 19804451.8, filed Feb. 5, 1998, which is incorporated herein by reference in its entirety.

EXAMPLES

Example 1 and Comparison A

|   | | Example 1 | Comparison A |
|---|---|---|---|
| | Component A (Binder) | | |
| 1 | Polyacrylate SETAL EPL 3627 (40% in water; Akzo Nobel Resins, Bergen op Zoom/NL) | 63.70% by wt | 63.70% by wt |
| 2 | 1-Methoxypropyl-2-acetate | 5.30% by wt | 5.30% by wt |
| 3 | Butyl glycol | 2.15% by wt | 2.15% by wt |
| 4 | Butyl glycol acetate | 2.15% by wt | 2.15% by wt |
| 5 | BYK 348 (Byk) | 0.27% by wt | 0.27% by wt |
| 6 | BYK 331 (Byk) | 0.13% by wt | 0.13% by wt |
| 7 | RHODOCHINE DF 6681 (Rhone-Poulenc) | 0.40% by wt | 0.40% by wt |
| 8 | ACRYLSOL RM 8 (40% in isopropanol/water) | 1.10% by wt | 1.10% by wt |
| | Component B (Polyisocyanate hardener) OH:NCO = 1:1.3 | | |
| 9 | MPDI isocyanurate, 90% in butyl acetate (VESTANET EP-T2500 E from Hüls AG, Marl/DE) | 13.90% by wt | — |
| | HDI isocyanurate, 90% in butyl acetate (DESMODUR D 3390 from Bayer, AG, Leverkusen/DE) | — | 13.90% by wt |
| | Diluent | | |
| 10 | Deonized Water | 10.90% by wt<br>E = 100% by wt | 10.90% by wt<br>E = 100% by wt |

Preparing the 2-component PU Coating Composition of the Invention

Components 1–8 are introduced into the vessel and mixed with a stirrer at a peripheral speed of 4 m/s. After thorough mixing, component 9 is added at the same peripheral stirrer speed Then, under constant mixing conditions, the diluent component 10 is added slowly. After the end of this addition, stirring is continued unaltered for 5 minutes more. The application-ready system has a viscosity corresponding to a flow time of about 20 seconds from the DIN 4 cup, a solids content of 38% by weight and a content of organic auxiliary solvent of 11.3% by weight.

Comparative Example A

The comparative example based on HDI isocyanurate was prepared in the same way as for the above 2-component PU coating composition of the invention.

Mechanical Data, Example 1 and Comparison A

The 2-component PU coating of the invention was prepared as described above and then, in order to determine the mechanical data, was applied directly to phosphated steel panel (Bonder 26S/60/OC) and cured at room temperature or at 80° C. for 30 minutes. The mechanical data indicated below should be understood as the ultimate values achievable. To determine the progress of curing, the steel panel dried at room temperature or at 80° C. for 30 minutes was stored at room temperature and measured again after 1 day, 3 days and 1 week.

Examples

| | Example 1 | | Comparison A | |
|---|---|---|---|---|
| Polyol | SETAL EPL 3627 | | | |
| Polyisocyanate | MPDI isocyanurate | | HDI isocyanurate | |
| OH:NCO | 1:1.3 | | | |
| Curing conditions | Room temp. | 30 min 80° C. | Room temp. | 30 min 80° C. |
| Dry film coat thickness [μm] | 28–32 | 26–32 | 29–36 | 31–37 |
| Cross-cut (EN ISO 2409) | 0 B | 0 B | 0 B | 0 B |
| Buchholz penetration hardness (DIN 53153) | 71 | 111 | 59 | 87 |
| König pendulum hardness (DIN 53157) [s] | | | | |
| after 1d | 28 | 127 | 25 | 94 |
| after 3d | 62 | 176 | 42 | 108 |
| after 7d | 72 | 181 | 44 | 118 |
| Erichsen indentation (DIN 53156) [mm] | 8.5 | 8.5 | 8.5 | 8.5 |
| Ball impact (Gardner, direct) [in lbs.] | 30 | 40 | >80 | >80 |
| Resistance to super-grade gasoline* | 1 | 1 | 1 | 1 |

*Super-grade gasoline was allowed to act on the coating for 30 seconds, and the coating was then assessed visually: 1: very good, 2: good, 3: moderate, 4: poor, 5: very poor.

Example 2 and Comparison B

|   | | Example 2 | Comparison B |
|---|---|---|---|
| | Component A (Binder) | | |
| | Polyester ADURA 100 (70% in water; Air Products, Allentown/USA) | 24.50% by wt | 24.60% by wt |
| 2 | BYK 011 (Byk) | 2.00% by wt | 2.00% by wt |
| 3 | BYK 348 (Byk) | 0.20% by wt | 0.20% by wt |
| 4 | BYK 333 (Byk) | 0.05% by wt | 0.05% by wt |
| 5 | TINUVIN 292 (Ciba) | 0.22% by wt | 0.22% by wt |
| 6 | TINUVIN 1130 (Ciba) | 0.22% by wt | 0.22% by wt |
| | Component B (Polyisocyanate hardener) OH:NCO = 1:1.6 | | |
| 7 | MPDI isocyanurate, 90% in butyl acetate (VESTANET EP-T2500 E from Hüls AG, Marl/DE) | 30.90% by wt | — |
| | HDI isocyanurate, 90% in butyl acetate (DESMODUR N 3390 from Bayer, AG, Leverkusen/DE) | — | 30.90% by wt |
| 8 | Deionized water | 41.90% by wt | 41.80% by wt |
| | Diluent | | |
| 9 | Deionized water | 41.90% by wt<br>E = 100% by wt | 41.80% by wt<br>E = 100% by wt | preparing the 2-component PU Coating Composition of the Invention

Components 1–6 are introduced into the vessel and mixed with a stirrer at a peripheral of 4 m/s. After thorough mixing, components 7 and then 8 are added at the same peripheral stirrer speed. Then, under constant mixing conditions, the diluent component 9 is added slowly. After the end of this addition, stirring is continued unaltered for 5 minutes more. The application-ready system has a viscosity corresponding to a flow time of about 20 seconds from the DIN 4 cup, a solids content of 45% by weight and a content of organic auxiliary solvent of 3.1% by weight.

Comparative Example B

The comparative example based on HDI isocyanurate was prepared in the same way as for the above 2-component PU coating composition of the invention.

Mechanical Data, Example 2 and Comparison B

The 2-component PU coating of the invention was prepared as described above and then, in order to determine the mechanical data, was applied directly to phosphated steel panel (Bonder 26S/60/OC) and cured at room temperature or at 80° C. for 30 minutes. The mechanical data indicated below should be understood as the ultimate values achievable. To determine the progress of curing, the steel panel dried at room temperature or at 80° C. for 30 minutes was stored at room temperature and measured again after 1 day, 3 days and 1 week.

|  | Example 2 | | Comparison B | |
| --- | --- | --- | --- | --- |
| Polyol | ADURA 100 | | | |
| Polyisocyanate | MPDI isocyanurate | | HDI isocyanurate | |
| OH:NCO | 1:1.6 | | | |
| Curing conditions | Room temp. | 30 min 80° C. | Room temp. | 30 min 80° C. |
| Dry film coat thickness [μm] | 37–45 | 39–47 | 41–49 | 39–48 |
| Cross-cut (EN ISO 2409) | 0 B | 0 B | 0 B | 0 B |
| Buchholz penetration hardness (DIN 53153) | 125 | 125 | 91 | 100 |
| König pendulum hardness (DIN 53157) [s] | | | | |
| after 1d | 26 | 98 | 19 | 76 |
| after 3d | 139 | 176 | 84 | 129 |
| after 7d | 175 | 191 | 106 | 154 |
| Erichsen indentation (DIN 53156) [mm] | 8.5 | 9.0 | 8.5 | 8.5 |
| Ball impact (Gardner, direct) [in lbs.] | >80 | >80 | >80 | >80 |
| Resistance to super-grade gasoline* | 1 | 1 | 1 | 1 |
| MEK Test (in accordance with ASTM D 4752) | >150 | >150 | >150 | >150 |

Example 3 and Comparison C

|  | Example 3 | Comparison C |
| --- | --- | --- |
| Component A (Binder) | | |
| 1 Polyacrylate JAGOTEX F 314 (37% in water/PROGLYDE DMM; Jager GmbH, Dusseldorf/DE) | 53.20% by wt. | 53.30% by wt. |
| 2 BYK 346 (Byk) | 1.00% by wt. | 1.00% by wt. |
| 3 BYK 020 (Byk) | 1.00% by wt. | 1.00% by wt. |
| Component B (Polyisocyanate hardener) OH:NCO = 1:1.2 | | |
| 4 MPDI Isocyanurate, 90% in butyl acetate (VESTANAT EP-T2500 E from Huls AG, Marl/DE) | 11.40% by wt. | |
| HDI Isocyanurate, 90% in butyl acetate (DESMODUR N 3390 from Bayer AG, Leverkusen/DE) | | 11.40% by wt. |

|  | Example 3 | Comparison C |
| --- | --- | --- |
| Diluent | | |
| 5 Deionized water | 33.40% by wt. E = 100% by wt. | 33.30% by wt. E - 100% by wt. |

Preparing the 2-component PU Coating Composition of the Invention

Components 1–3 are introduced into the vessel and mixed with a stirrer at a peripheral speed of 4 m/s. After thorough mixing, component 4 is added at the same peripheral stirrer speed. Then, under constant mixing conditions, the diluent component 5 is added slowly. After the end of this addition, stirring is continued unaltered for 5 minutes more. The application-ready system has a viscosity corresponding to a flow time of about 20 seconds from the DIN 4 cup, a solids content of 30% by weight and a content of organic auxiliary solvent of 4.9% by weight.

Comparative Example C

The comparative example based on HDI isocyanurate was prepared in the same way as for the above 2-component PU coating composition of the invention.

Mechanical Data Example 3 and Comparison C

The 2-component PU coating of the invention was prepared as described above and then, in order to determine the mechanical data, was applied directly to phosphated steel panel (Bonder 26S/60/OC) and cured at room temperature or at 80° C. for 30 minutes. The mechanical data indicated below should be understood as the ultimate values achievable. To determine the progress of curing, the steel panel dried at room temperature or at 80° C. for 30 minutes was stored at room temperature and measured again after 1 day, 3 days and 1 week.

|  | Example 3 | | Comparison C | |
| --- | --- | --- | --- | --- |
| Polyol | JAGOTEX F 314 | | | |
| Polyisocyanate | MPDI isocyanurate | | HDI isocyanurate | |
| OH:NCO | 1:1.2 | | | |
| Curing conditions | Room temp. | 30 min 80° C. | Room temp. | 30 min 80° C. |
| Dry film coat thickness [μm] | 21–29 | 21–24 | 23–27 | 21–27 |
| Cross-cut (EN ISO 2409) | 1 B | 1 B | 1 B | 1 B |
| König pendulum hardness (DIN 53157) [s] | | | | |
| after 1d | 24 | 55 | 15 | 28 |
| after 3d | 25 | 64 | 15 | 31 |
| after 7d | 28 | 70 | 18 | 33 |
| Erichsen indentation (DIN 53156) [mm] | >9.5 | >9.5 | >9.5 | >9.5 |
| Ball impact (Gardner, direct) [in lbs.] | >80 | >80 | >80 | >80 |
| Resistance to super-grade gasoline* | 1 | 1 | 1 | 1 |

*Super-grade gasoline was allowed to act on the coating for 30 seconds, and the coating was then assessed visually: 1: very good, 2: good, 3: moderate, 4: poor, 5: very poor.

Example 4

|  | Example 4 |
| --- | --- |
| Component A (binder) | |
| 1 Polyacrylate JAGOTEX F 314 (37% in water/Proglyde DMM; Jäger GmbH, Düsseldorf/DE) | 51.20% by wt |
| 2 BYK346(Byk) | 1.00% by wt |
| 3 BYK 020 (Byk) | 1.00% by wt |
| Component B (Polyisocyanate hardener) OH:NCO = 1:1.2 | |
| 4 MPDI Isocyanurate, 90% in butyl acetate (VESTANAT EP-T2500 E from Hüls AG, Marl/DE) | 6.10% by wt |
| 5 IPDI isocyanurate, 90% in butyl acetate (VESTANAT T 1890 E from Hüls AG, Marl/DE) | 7.90% by wt |
| Diluent | |
| 6 Deionized water | 32.80% by wt |
|  | E = 100% by wt |

Preparing the 2-component PU Coating Composition of the Invention

Components 1–3 are introduced into the vessel and mixed with a stirrer at a peripheral speed of 4 m/s. After thorough mixing, a mixture of components 4 and 5 is added at the same peripheral stirrer speed. Then, under constant mixing conditions, the diluent component 6 is added slowly. After the end of this addition, stirring is continued unaltered for 5 minutes more. The application-ready system has a viscosity corresponding to a flow time of about 20 seconds from the DIN 4 cup, a solids content of 30% by weight and a content of organic auxiliary solvent of 6.6% by weight.

Mechanical Data, Example 4

The 2-component PU coating of the invention was prepared as described above and then, in order to determine the mechanical data, was applied directly to phosphated steel panel (Bonder 26S/60/OC) and cured at room temperature or at 80° C. for 30 minutes. The mechanical data indicated below should be understood as the ultimate values achievable. To determine the progress of curing, the steel panel dried at room temperature or at 80° C. for 30 minutes was stored at room temperature and measured again after 1 day, 3 days and 1 week.

|  | Example 4 | |
| --- | --- | --- |
| Polyol | JAGOTEX F 314 | |
| Polyisocyanate | MPDI isocyanurate and HDI isocyanurate | |
| OH:NCO | 1:1.2 | |
| Curing conditions | Room temp. | 30 min 80° C. |
| Dry film coat thickness [μm] | 25–31 | 26–33 |
| Cross-cut (EN ISO 2409) | 0 B | 0 B |
| König pendulum hardness (DIN 53157) [s] | | |
| after 1d | 33 | 98 |
| after 3d | 54 | 127 |
| after 7d | 95 | 154 |
| Erichsen indentation (DIN 53156) [mm] | >9.5 | >9.5 |
| Ball impact (Gardner, direct [in lbs.] | >80 | >80 |
| Resistance to super-grade gasoline* | 1 | 1 |

*Super-grade gasoline was allowed to act on the coating for 30 seconds, and the coating was then assessed visually: 1: very good, 2: good, 3: moderate, 4: poor, 5: very poor.

Obviously, numerous modifications and variations of the present invention are possible in light of the above teachings. It is, therefore, to be understood that within the scope of the appended claims, the invention may be practiced otherwise than as specifically described herein.

What is claimed is:

1. An aqueous two-component polyurethane coating composition comprising:

A) an aqueous dispersion of at least one polyol component,

B) a polyisocyanate component based on 2-methylpentane-1,5-diisocyanate (MPDI), wherein the proportions of A and B corresponding to an OH/NCO equivalents ratio is from 1:0.5 to 1:5.

2. The composition as claimed in claim 1, wherein the MPDI-based polyisocyanate present is selected from the group consisting of biuret-, uretdione-, isocyanurate-based polyisocyanate, a mixture thereof and those in allophanate-modified form, wherein said MPDI-based polyisocyanate has an average functionality of 2.3 to 5.

3. The composition as claimed in claim 1, which comprises the isocyanurate of MPDI.

4. The composition as claimed in claim 1, which comprises a polyisocyanate having a residual monomer content of <0.5% by weight.

5. The composition as claimed in claim 1, which as polyol component A) comprises a resin selected from the group consisting of a hydroxyl-containing polyacrylate, a polyester, a polyurethane and a mixture thereof.

6. The composition as claimed in claim 1, which comprises a polyisocyanate selected from the group consisting of a (cyclo)aliphatic polyisocyanate, an aromatic polyisocyanate and a mixture thereof.

7. The composition as claimed in claim 6, wherein said (cyclo)aliphatic polyisocyanate is selected from the group consisting of hexamethylene diisocyanate, isophorone diisocyanate and bis(isocyanatocyclohexyl)methane.

8. The composition as claimed in claim 6, wherein said aromatic polyisocyanate is selected from the group consisting of tetramethylxylylene diisocyanate, diisocyanatotoluene and diisocyanatodiphenylmethane.

9. The composition as claimed in claim 1, which comprises an additional auxiliary.

10. The composition as claimed in claim 9, wherein said auxiliary is selected from the group consisting of a pigment, a defoamer, a leveling agent, a thickener, a siccative, a filler, a catalyst for the isocyanate addition reaction and a mixture thereof.

11. The composition as claimed in claim 1, wherein said polyisocyanate component has a viscosity at 23° C. of 10 to 20,000 mPa•s.

12. The composition as claimed in claim 1, further comprising a solvent selected from the group consisting of an aromatic hydrocarbon, an ester, an ether, a ketone and a mixture thereof.

13. The composition as claimed in claim 1, wherein the solids content of the composition is from 25 to 60% by weight.

14. The composition as claimed in claim 1, further comprising a solvent in an amount of from 0 to 20% by weight.

15. The composition as claimed in claim 1, wherein the initial viscosity of the composition is of from 10 to 1000 mPa•s.

16. The composition as claimed in claim 1, wherein the pH of the composition is from 6 to 10.

17. An aqueous coating material comprising an aqueous 2-component polyurethane coating composition as claimed in claim 1.

\* \* \* \* \*